(No Model.)
G. W. & J. E. LILLY.
FARM GATE.
No. 579,066. Patented Mar. 16, 1897.
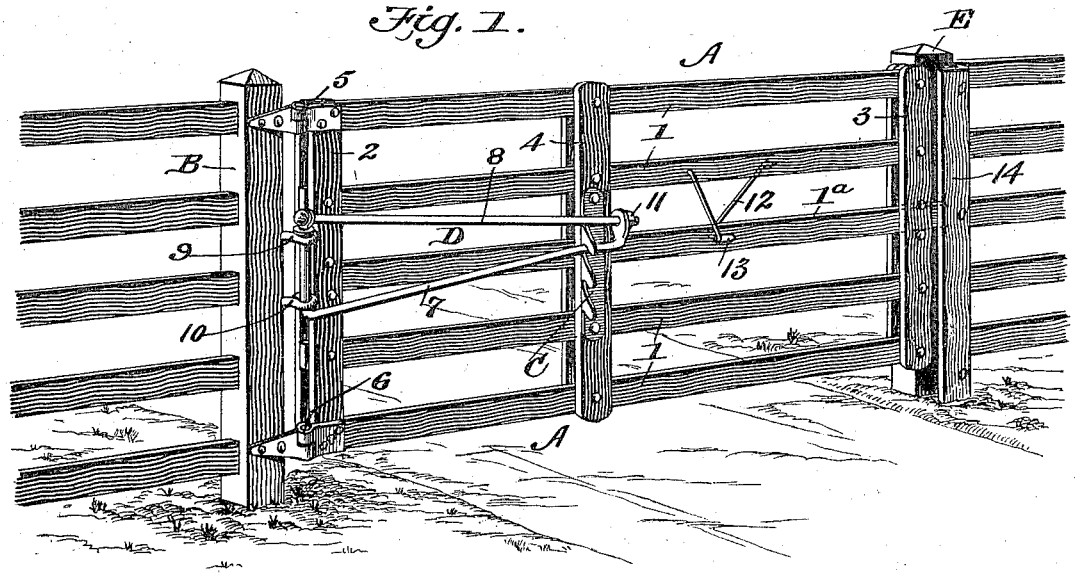
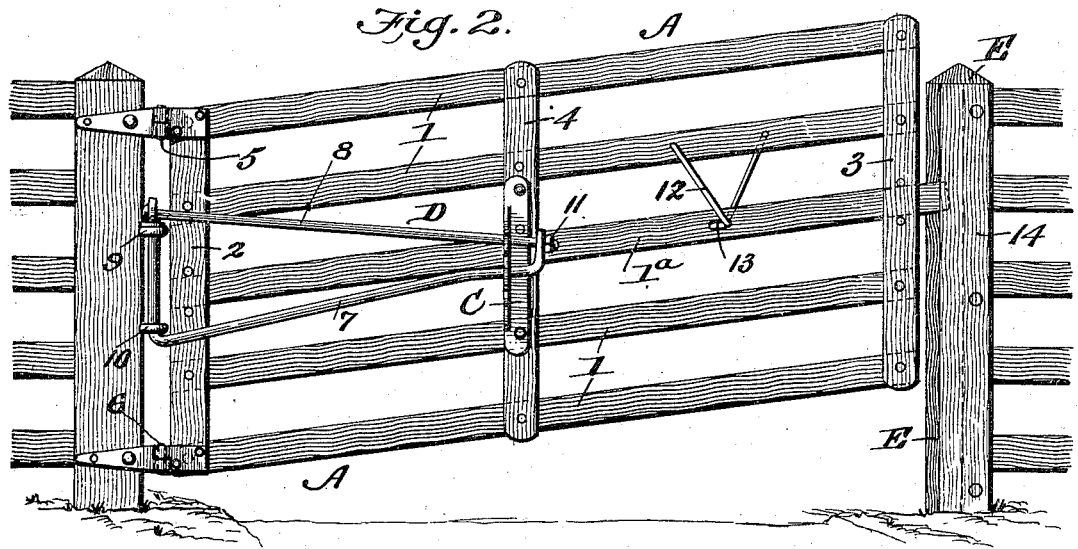
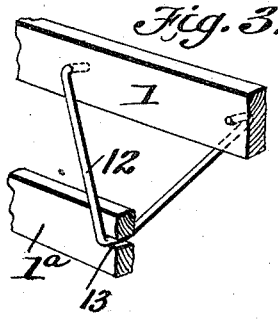
WITNESSES:
M. S. Blondel
A. W. Hast
INVENTORS
George W. Lilly.
John E. Lilly.
BY Munn & Co.
ATTORNEYS.

UNITED STATES PATENT OFFICE.

GEORGE W. LILLY AND JOHN E. LILLY, OF SEDALIA, MISSOURI.

FARM-GATE.

SPECIFICATION forming part of Letters Patent No. 579,066, dated March 16, 1897.

Application filed December 11, 1896. Serial No. 615,264. (No model.)

*To all whom it may concern:*

Be it known that we, GEORGE W. LILLY and JOHN E. LILLY, of Sedalia, in the county of Pettis and State of Missouri, have invented a new and useful Improvement in Farm-Gates, of which the following is a specification.

Our invention is an improvement in the class of horizontally-swinging gates which are adapted to close automatically by gravity, and whose free ends may be adjusted vertically, as required, to enable the gate to swing over stones or other obstructions and to be used for separating small domestic animals, such as sheep and swine, from larger ones, such as horses and horned cattle.

The construction, combination, and operation of parts are as hereinafter described and claimed.

In the accompanying drawings, Figure 1 is a perspective view of the gate in normal position. Fig. 2 is a side view of the gate, showing it elevated. Fig. 3 is an enlarged sectional perspective of the latch.

The body A of the gate is composed of parallel lengthwise slats or bars 1 and three parallel vertical connecting pairs of bars 2 3 4, the same being pivoted together by pins or bolts passing through them transversely. The gate swings on a post B by hinges 5 and 6.

The means for supporting the free end of the gate at different elevations are as follows: A toothed or ratchet plate C is attached vertically to the central connecting-bar 4 of the gate and its teeth project downward, as shown. A triangular device D, consisting of metal rods or bars 7 and 8, engages at one end with such toothed plate C and is hinged to the post B at the other end. Its hinges 9 and 10 are set slightly out of vertical alinement with gate-hinges 5 and 6. One, 7, of the rods or bars composing the device D is bent at a right angle at each end, and the other and upper rod 8 serves as a tension member, since it passes through eyes formed in the ends of the angular rod 7 and is provided with a nut 11, as shown.

It is obvious that by adjusting the pointed free end of the device D higher or lower in engagement with the toothed plate C the free end of the gate A may be held or supported at different elevations, as required for different uses or functions. Thus the gate A may be held raised in an inclined position, as shown by full lines, Fig. 2, whereby it is adapted for swinging over stones or other obstructions, or up a side hill, in opening and closing. The same adjustment or elevation of the gate permits the passage of small stock, like sheep and swine, beneath it, while escape of large stock, such as horses and horned cattle, is prevented. It will be seen the position of the hinges of the device D causes the gate A to close by gravity, whatever be the elevation of the gate by means of said device.

The middle slat $1^a$ serves as a sliding latch which may be operated manually, but it is also operated automatically by a device 12, attached to an adjacent slat 1. Said device is formed of a stout V-shaped wire, which passes through a lengthwise slot 13 in the sliding latch $1^a$. The said slot is so arranged that as the gate A rises the slat $1^a$ will be pushed farther out, as shown in Fig. 2, and will be retracted somewhat when the gate descends to its former position, so as to remain engaged with the latch-plate 14 on post E.

What we claim is—

1. In a gate of the class specified, the combination, with the gate proper, hinged and adapted to swing horizontally, and formed of horizontal slats and vertical connecting-bars pivoted together, of the triangular device D, hinged alongside the gate and formed of a right-angular rod and a tension-rod, and a toothed plate secured vertically to the gate proper, and engaging the pointed end of said device, as shown and described.

2. In a gate of the class specified, the combination, with the gate proper, hinged to swing horizontally and adapted to be adjusted vertically at its free end, and means for holding the gate at different elevations, of a slidable and slotted latch-slat, and a device attached to a fixed slat and engaging the slot, as shown and described to operate as specified.

GEORGE W. LILLY.
JOHN E. LILLY.

Witnesses:
JAS. W. BYLER,
J. D. FRANKLIN.